(12) United States Patent
Spector et al.

(10) Patent No.: US 10,955,529 B2
(45) Date of Patent: Mar. 23, 2021

(54) NONLINEAR CIRCULATOR FOR PULSED LIGHT

(71) Applicant: The Charles Stark Draper Laboratory, Inc., Cambridge, MA (US)

(72) Inventors: Steven J. Spector, Lexington, MA (US); Michael G. Moebius, Allston, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 588 days.

(21) Appl. No.: 15/885,204

(22) Filed: Jan. 31, 2018

(65) Prior Publication Data

US 2019/0235053 A1   Aug. 1, 2019

(51) Int. Cl.
*G01S 7/481* (2006.01)
*G01S 17/10* (2020.01)
*G02B 6/12* (2006.01)
*G02F 1/225* (2006.01)
*G01J 3/02* (2006.01)
*G02F 1/21* (2006.01)
*G02F 1/35* (2006.01)

(52) U.S. Cl.
CPC ............. *G01S 7/4811* (2013.01); *G01J 3/02* (2013.01); *G01S 17/10* (2013.01); *G02B 6/12004* (2013.01); *G02B 6/12007* (2013.01); *G02F 1/225* (2013.01); *G02B 2006/12061* (2013.01); *G02B 2006/12159* (2013.01); *G02F 1/35* (2013.01); *G02F 2001/212* (2013.01)

(58) Field of Classification Search
CPC ...... G01S 7/4811; G01S 17/10; G01S 7/4812; G02B 6/12007; G02B 6/12004; G02B 2006/12061; G02B 2006/12159; G02F 1/225; G02F 2001/212; G02F 1/35; G01J 3/02
USPC ......................................... 356/4.01
See application file for complete search history.

(56) References Cited

PUBLICATIONS

Almeida et al., *All-optical control of light on a silicon chip*, Nature, Nature Publishing Group, vol. 431, pp. 1081-1084, Oct. 28, 2004.
Robinson et al., *Photonic crystal ring resonator-based add drop filters: a review*, SPIE Digital Library, Optical Engineering, vol. 52, Issue 6, 12 pages, Jun. 12, 2013.
Lane et al., U.S. Appl. No. 62/498,158, filed Dec. 16, 2016 with the United States Patent and Trademark Office, 31 pages.

*Primary Examiner* — Daniel L Murphy
(74) *Attorney, Agent, or Firm* — Sunstein LLP

(57) ABSTRACT

A monostatic optical system adaptable for use as a circulator in a LiDAR system wherein the monostatic optical system includes a photonic integrated circuit and a first light detector. The photonic integrated circuit includes a nonlinear optical device. For example, the device may be a ring resonator or a Mach-Zehnder interferometer. Transmitted light pulses are of sufficient power to alter the optical characteristics of the nonlinear optical device, whereas received reflected light is of low power thereby traveling on a different path to the first light detector. A feedback monitor and tuner may be included to tune the optical characteristics of the nonlinear optical device.

20 Claims, 1 Drawing Sheet

NONLINEAR CIRCULATOR FOR PULSED LIGHT

TECHNICAL FIELD

The present invention relates to monostatic optical systems, and more particularly to photonic integrated circuits suitable for monostatic operation.

BACKGROUND ART

Optical devices used as both a transmitter and a receiver are called monostatic. A monostatic system has the advantages of being compact and inherently self-aligned. One disadvantage of a monostatic system is that the transmitted light and returned light need to be separated so that a laser can be used as an input to transmit light, and light being received by the system reaches a detector. This can be done with a beam splitter, but half the light is lost in each direction with such an arrangement.

A circulator can be used to avoid this optical loss. Circulators are extremely useful devices for separating light traveling in opposite directions. However, circulators rely on Faraday rotators for their nonreciprocal properties, and relatively few materials exist that have the required properties to be a useful Faraday rotator. These materials have proven hard to build into a photonic integrated circuit ("PIC"). Acceptable performance is currently only available in discrete devices, limiting the scalability of devices that require circulators. With a single laser and detector the use of a circulator is straightforward. In many systems, a large number of detectors are necessary to measure multiple beams, for faster pixel rates. Discrete circulators make scaling to a large number of detectors impractical. An integrated circulator would allow the scaling to a large number of simultaneous beams.

SUMMARY OF THE EMBODIMENTS

In accordance with one embodiment of a monostatic optical system of the invention, a nonlinear optical device is used in a photonic integrated circuit. Arranging the nonlinear optical device to act as a circulator makes miniaturization possible for a larger array of circulators. The photonic integrated circuit includes a transmitter input port at an end of a first waveguide through which a laser light may be injected. A light transceiver port serves as the port through which the laser light exits and acts as the locus for reception of externally reflected light. The optical characteristics of the nonlinear optical device is such that laser light of sufficient power travels from the transmitter input port out through the light transceiver port. Externally reflected light received at the light transceiver port having insufficient power to alter the optical characteristics of the nonlinear optical device is directed through a second waveguide to a light detector. In some embodiments, the path of the reflected light through the second waveguide is a reversal of direction.

A feedback monitor may be included in conjunction with a tuner for adjusting the optical characteristics of nonlinear media within the nonlinear optical device. The tuner may be a resistive heater.

In accordance with one embodiment, the nonlinear media is in a ring resonator. The ring resonator is characterized by a resonant wavelength at the low optical power state of the externally reflected light. The ring resonator includes a closed loop waveguide situated between the first waveguide and the second waveguide. A typical embodiment of the ring resonator is made from silicon-rich silicon nitride. In some embodiments, the first and second waveguides are parallel to one another According to another embodiment, the nonlinear optical device is a Mach-Zehnder interferometer that includes nonlinear optical media. A Mach-Zehnder interferometer includes a phase shifter.

According to a method of the invention, a photonic integrated circuit is provided with a nonlinear optical device situated in a path between a transmitter input port at an end of a first waveguide and a light transceiver port. A series of laser light pulses are transmitted through the transmitter input port, the laser light pulses having sufficient power to alter optical characteristics of the nonlinear optical device so that the laser light pulses continue along the path out through the light transceiver port. Externally reflected laser light is received at the light transceiver port at intervals between the transmission of the laser light pulses. The reflected laser light continues along a second waveguide because it has insufficient power to alter the optical characteristics of the nonlinear optical device. The received reflected light is detected at a first light detector at an end of the second waveguide.

The method may further include detecting light fed back from the nonlinear optical device and tuning the optical characteristics of the nonlinear optical device in response to the detection of fed back light. Tuning may be performed by heating the nonlinear optical device.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

One application that could benefit from a large number of circulators is a LiDAR ("light detection and range finding") system. In this system, light is coupled from a laser, or group of lasers to a photonic integrated circuit (PIC). The PIC can use a number of technologies to project the light out, such as phased arrays or a planar N×1 optical switch optically coupled to a lens. To get ranging information, the return light can travel through the same path in reverse, and then go to a photodetector or array of photodetectors.

Figure 1:
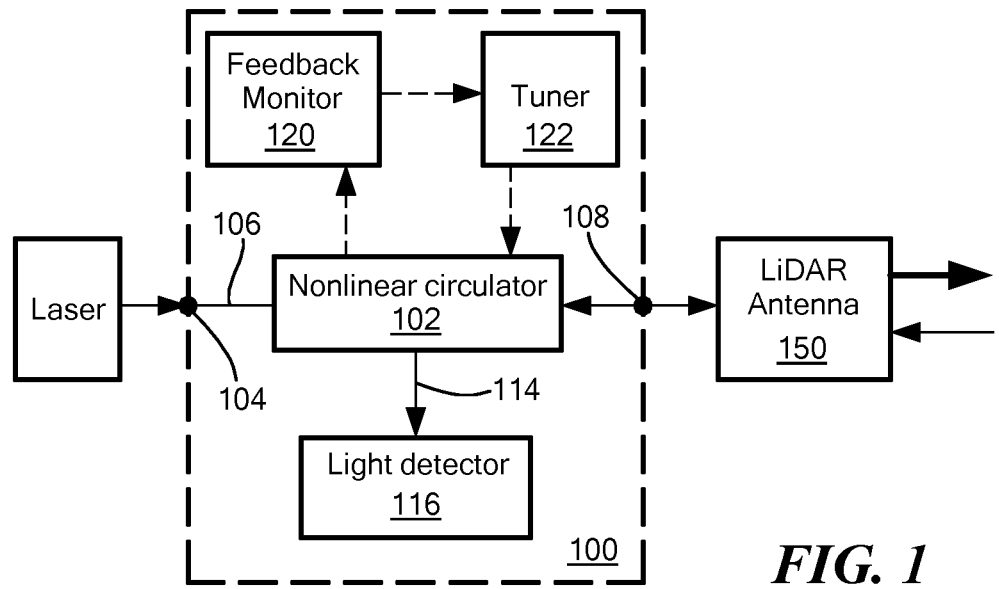
FIG. 1 is a block diagram of a light detection and range finding (LiDAR) system using a monostatic optical system of an embodiment of the present invention.

Referring now to FIG. 1, an embodiment of the monostatic optical system 100 of the present invention shall be described. Light separation is achieved by a nonlinear optical device 102, which includes a nonlinear optical medium integrated into an interferometer or filter. The nonlinear optical device may be advantageously fabricated on a PIC. The nonlinearity directs high power and low power light differently. This works especially well for a LiDAR system, because in a LiDAR system the power in the outgoing light is much larger than the power in the received light. In a pulse system, these pulses can be timed so the forward and reverse pulses travel through the PIC at different times.

Light is directed into a transmitter input port 104 at an end of a first waveguide 106 coupled to the nonlinear optical device 102. Light exits from a light transceiver port 108. Thus, the injected light follows a path from the transmitter input port 104 to the nonlinear optical device 102 to the light transceiver port 108. For this path to be followed the light must have sufficient power to alter optical characteristics of the nonlinear optical media. A laser used in a LiDAR system normally meets the power requirement.

Light exiting from the light transceiver port will typically be directed out through a LiDAR antenna 150. In some systems, the LiDAR antenna will be configured to steer and focus the light. The light is reflected externally off objects in the field of view. Reflected light received at the antenna 150 is directed into the light transceiver port 108. The reflected light is at a lower power than the original transmitted laser light. The low power light passes through the nonlinear optical device 102 without altering its optical characteristics. Consequently, the nonlinear optical device 102 directs the reflected light to a second waveguide 114. A first light detector 116 is situated to receive light that exits from the second waveguide 114. The light detector 116 and portions of the LiDAR antenna, such as beam steering, may be fabricated on the same PIC along with the nonlinear optical device 102. Alternatively, the system can consist of multiple chips with the light detector 116 and LiDAR antenna 150 being on separate chips.

In order to make use of the monostatic optical system 100 in the LiDAR system, laser light pulses are transmitted through the transmitter input port. The laser light pulses have sufficient power to alter optical characteristics of the nonlinear optical media in the nonlinear optical device 102 so that the laser light pulses continue along the path out through light transceiver port 108. Reflected light is received into the light transceiver port 108 at intervals between the transmission of the laser light pulses. The reflected light is detected at the first light detector 116.

In order to control the optical characteristics of the nonlinear optical media 102 so that reflected light is adequately separated from the transmission path and directed to the second waveguide for a given laser input, a feedback monitor 120 may be included in the system. The feedback monitor can be fabricated on the PIC of the nonlinear optical device 102 or provided on its own separate chip. The feedback monitor 120 receives stray laser light misdirected by the nonlinear optical device 102. The amount of this misdirected light is an indication of the tuning accuracy of the nonlinear optical device 102. A tuner 122 works in conjunction with and responsive to the feedback monitor 120. The tuner 122 adjusts the optical characteristics of the nonlinear optical device 102. In a preferred embodiment, the tuner 122 is a resistive heater for a nonlinear optical media having optical characteristics functionally responsive to the temperature of the optical media. Methods other than resistive heating can be used to tune the optical properties of the nonlinear optical media, for example, electro-optic tuning.

Figure 2:
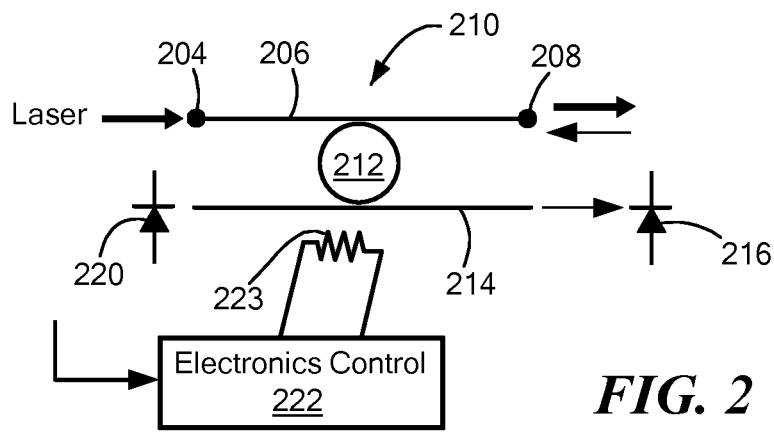
FIG. 2 is a diagram of a ring resonator embodiment for use as the nonlinear optical device of the monostatic optical system of FIG. 1.

The nonlinear optical device 102 can be an optical ring resonator 210 according to an embodiment of the invention as shown in FIG. 2. An optical ring resonator 210 includes at least one closed loop waveguide 212 situated between a first waveguide 206 and a second waveguide 214. The ring resonator should be constructed at least partially of a material that has sufficient non-linearity, and low optical loss, and it should be compatible with the rest of the materials of the PIC. Silicon-rich silicon nitride is one material suitable for the ring resonator. A couple other examples of materials with nonlinear properties include titanium oxide and diamond. The first waveguide 206 and the second waveguide 214 are coupled to two different locations on the ring. In some embodiments as shown, they may be parallel to one another at the closed loop waveguide 212. In a low optical power state, the resonator is characterized by a resonant wavelength. Light in one waveguide at the resonant wavelength of insufficient power to shift the resonance of the resonator is redirected by the resonator in a reverse direction into the other waveguide. The resonant condition is met when a whole number of wavelengths precisely fit in the closed loop.

Transmitter input port 204 is at an end of the first waveguide 206 into which laser light can be directed. Light transceiver port 208 is at an end of the first waveguide 204 opposite from the transmitter input port 204. When laser light is at a high optical power state, the non-linear response of the ring resonator switches off resonance permitting the laser light to pass through the first waveguide without being significantly redirected by the ring. Because the ring is a resonant device, power builds up in the ring, increasing the non-linear response. The larger the change in refractive index due to the nonlinear response, the less length of waveguide required to achieve a given phase shift. Ring resonators are typically characterized by a high Q-factor leading to a narrower resonance. As a result, a phase shift of much less than it is necessary to switch the device off resonance. The narrow resonance and the nonlinear response combine to allow the circulator device to be much shorter and, thereby, more compact than a non-resonant device.

First light detector 216 is situated at an end of the second waveguide 214 proximate to the light transceiver port. The ring resonator 210 redirects reflected light received at the light transceiver port 208 from the first waveguide 206 to the second waveguide 214 so as to be detected at the first light detector 216. In a typical embodiment, reflected light enters the ring resonator in one direction and leaves the ring in a reverse direction. The first light detector 216 may be a photodiode, which may be included on the PIC of the nonlinear optical device or on a separate adjacent chip.

A feedback monitor and tuner may be included along with the nonlinear optical device to thermally tune the ring resonator to the correct resonant wavelength. These may be fabricated on the PIC of the nonlinear optical device or on a separate adjacent chip. An exemplary feedback monitor can include a second light detector 220 situated at an end of the second waveguide 214 remote from the light transceiver port 208. The second light detector 220 is typically a photodiode. The second light detector 220 detects the transmit power that leaks through to the second waveguide 214. It can be expected that if the pulse power is constant, there should be an optimum power on this photodiode that corresponds to the proper resonance. If there is too much power on the diode it means the ring is shifting to resonance at the high power condition, rather than away from it. If there is too little power, it means the ring is too far from resonance to get the optimum shift. Once the optimum power on the second light detector 220 is known, a simple feedback loop can be used to heat the ring to keep the power optimum. A tuner comprised of an electronic control 222 and a resistive heater 223 tunes the resonant ring wavelength of the optical ring resonator in response to signals from the second light detector 220. This feedback loop also compensates for any drifting of the laser wavelength that may occur.

It should be noted that the feedback loop only works over a limited range, so another method is necessary for initializing the wavelength of the ring and laser, and to keep the laser and ring resonator wavelengths from drifting too far apart. This can be done by a pre-calibration together with coarsely monitoring the temperature of the laser and optionally the ring. Initializing could be done by premeasuring the location of the resonance, and storing the information. This could be done by turning the laser on and scanning the heater power while measuring the light on the second light detector 220. This could be also done for multiple background temperatures, to know the relationship between the background temperature and resonant frequency. But this latter exercise is probably unnecessary because for many devices the relationship between temperature and resonant frequency is predictable.

In order to perform light detection and range finding with the photonic integrated circuit of FIG. 2, a laser having a wavelength corresponding to the resonant wavelength at the resonator's low optical power state is used. A series of laser light pulses are transmitted through the transmitter input port 204. The laser pulses need to be of sufficient power to shift the resonant wavelength of the resonator so that the light pulses continue through the first waveguide and out through the light transceiver port 208. "Sufficient" power is that which produces a resonant wavelength shift that propagates the light pulses to the light transceiver port with no more than a 3 dB loss of light power. Thus, at least half the light from a light pulse makes it out through the transceiver port. The laser pulses reflect off objects in the field of view and some reflected light at a much reduced power level is received at the light transceiver port. The reflected light arrives at intervals in between the transmission of the laser light pulses. The reflected light has insufficient power to shift the resonant wavelength of the resonator. Thus, the reflected light reverses direction at the ring resonator and is detected by the first light detector 216 at an end of the second waveguide.

One challenge with the ring resonator technique is that there are different non-linear effects. The non-linear Kerr effect is very fast (essentially instantaneous), and is the effect that is best suited for this application. However, light can heat the ring, which also shifts the resonant wavelength. This effect is very slow. To function in the presence of the thermally induced non-linearity, the transmitted pulses can be made close enough together that the thermally induced shift in resonant wavelength is nearly constant. This is the case as long as the spacing between pulses is much greater than the thermal time constant of the waveguides. Because the thermal time constants are on the order of ~10 µs, modest pulse rates (>10 MHz) are all that is necessary. The constant shift in resonant wavelength can be compensated for by shifting the laser wavelength or by thermally tuning the ring.

Figure 3:
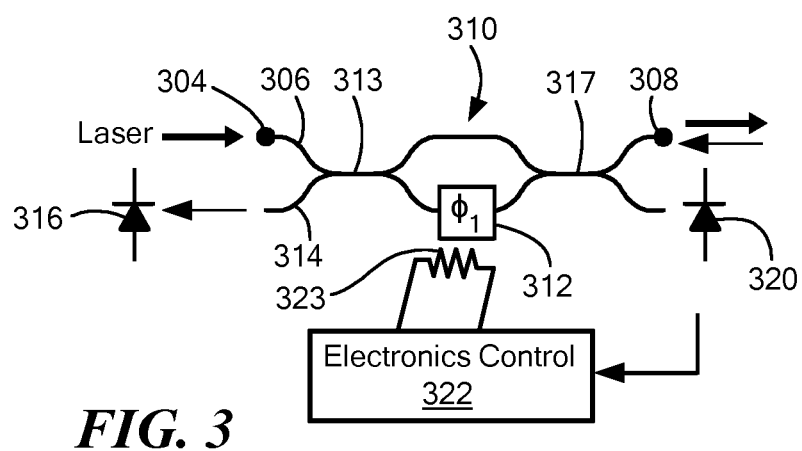
FIG. 3 is a diagram of a Mach-Zehnder embodiment for use as the nonlinear optical device of the monostatic optical system of FIG. 1.

According to an alternative embodiment, the nonlinear optical media can be incorporated into a Mach-Zehnder interferometer 310 as shown in FIG. 3. The Mach-Zehnder interferometer includes a phase shifter 312 on one of the arms between a 3 dB coupler 313 at an input end and a 3 dB coupler 317 at an output end. An optical signal is introduced into a transmitter input port 304 at an end of a first waveguide 306 of the interferometer. The phase shifter 312 should be adjusted so that the amount of phase shift introduced by an optical signal of sufficient power directs the signal toward the light transceiver port 308. The optical signal should reach the light transceiver port with no more than 3 dB of light power loss. In preferred embodiments, the optical signal is laser light. Externally reflected light which returns to the light transceiver port is of much lower power than the originally input optical signal. As a result, the optical characteristics of the interferometer will direct the reflected light to a second waveguide 314. A light detector 316 is situated to receive light that exits from the second waveguide 314.

In order to accurately tune the phase shifter 312, feedback monitoring can be provided on the PIC of the interferometer or on a separate adjacent chip. A second light detector 320 is situated to receive optical signal which did not get directed to the light transceiver 308 by the phase shift. The amount of this misdirected light allows for determination by an electronics control 322 of an appropriate amount of adjustment to the phase shifting properties of phase shifter 312. Typically, the tuning is performed by a resistive heater 323.

In operation as a LiDAR system, laser light pulses are directed into the transmitter input port 304. The light couples to the light transceiver port 308. The amount of light that couples to the light transceiver port depends on the relative phase in the arms between the 3 dB coupler 313 and the 3 dB coupler 317. Similarly, in reverse, whether the light couples to the top or bottom port depends on the relative phase. To properly operate as a circulator, at the low power of the externally reflected light the phase shifter 312 should send that light to the second waveguide 314 for detection by the first light detector 316. If the relative phase between the arms changes by π between the transmitted pulse and the received pulse, the transmitted pulse and received pulse will couple to different output ports. This phase shift is created by using a nonlinear optical material, so that at higher optical powers the material produces exactly the required π phase shift relative to lower optical powers. The challenge with this solution is that the amount of phase shift has to be exactly, or at least very close to π. Additionally, fairly high optical powers and long path lengths are typically necessary to produce that much phase shift. As an enhancement, one can use more complex structures to boost the nonlinear optical interaction. For example, photonic crystal waveguides or slot waveguides containing highly nonlinear media could be used in the nonlinear optical device.

The embodiments of the invention described above are intended to be merely exemplary; numerous variations and modifications will be apparent to those skilled in the art. For example, the nonlinear optical media could also be embodied in a photonic crystal ring structure. Furthermore, ring resonators can be made with one or more closed loops of any of a variety of shapes including oval and serpentine. All such variations and modifications are intended to be within the scope of the present invention as defined in any appended claims.

What is claimed is:

1. A monostatic optical system comprising:
   a photonic integrated circuit including:
   (i) a transmitter input port at an end of a first waveguide into which laser light gets directed;
   (ii) a light transceiver port out from which light exits;
   (iii) a nonlinear optical device in a path between the transmitter input port and the light transceiver port, wherein the nonlinear optical device has optical characteristics that are altered by laser light of sufficient power directed into the transmitter input port so that the laser light with no more than 3 dB of light power loss is directed out through the light transceiver port; and
   (iv) a second waveguide coupled to the nonlinear optical device, wherein the nonlinear optical device has optical characteristics in a low optical power state that directs light received by the photonic integrated circuit at the light transceiver port to the second waveguide; and
a first light detector situated to receive light that exits from the second waveguide.

2. The monostatic optical system of claim 1, wherein the transmitter input port and the light transceiver port are on opposite ends of the first waveguide.

3. The monostatic optical system of claim 1, wherein the first light detector receives light through the second waveguide, such that externally reflected light from the laser received at the light transceiver port and having insufficient power to alter the optical characteristics of the nonlinear optical device will be redirected by the nonlinear optical device so as to reverse direction and pass into the second waveguide on its way to the first light detector.

4. The monostatic optical system of claim 1, wherein the nonlinear optical device comprises a ring resonator characterized at the low optical power state by a resonant wavelength.

5. The monostatic optical system of claim 4, wherein the ring resonator comprises a closed loop waveguide situated between the first waveguide and the second waveguide.

6. The monostatic optical system of claim 5, wherein the first and second waveguides are parallel to one another.

7. The monostatic optical system of claim 4, wherein the ring resonator is made from silicon-rich silicon nitride.

8. The monostatic optical system of claim 1, wherein the nonlinear optical device comprises a Mach-Zehnder interferometer having a phase shifter.

9. The monostatic optical system of claim 1, further comprising:
a second light detector situated to receive laser light fed back from the nonlinear optical device; and
a tuner operatively coupled to the second light detector and the nonlinear optical device so as to tune the optical characteristics of the nonlinear optical device responsive to signals from the second light detector.

10. The monostatic optical system of claim 9, wherein the tuner comprises a resistive heater.

11. The monostatic optical system of claim 1, wherein the first light detector is included in the photonic integrated circuit.

12. A method of light detection and range finding comprising:
providing a photonic integrated circuit having a nonlinear optical device situated in a path between a transmitter input port at an end of a first waveguide and a light transceiver port;
transmitting a series of laser light pulses through the transmitter input port, wherein the laser light pulses have sufficient power to alter optical characteristics of the nonlinear optical device so that the laser light pulses continue along the path out through the light transceiver port with no more than 3 dB of light power loss;
receiving externally reflected light into the light transceiver port at intervals between the transmission of the laser light pulses, wherein the reflected light has insufficient power to alter the optical characteristics of the nonlinear optical device so that reflected light continues along a second waveguide; and
detecting the reflected light at a first light detector situated to receive light exiting from an end of the second waveguide.

13. The method of light detection and range finding of claim 12, further comprising detecting light fed back from the nonlinear optical device and tuning the optical characteristics of the nonlinear optical device in response to the detection of fed back light.

14. The method of light detection and range finding of claim 13, wherein tuning comprises heating the nonlinear optical device.

15. A monostatic optical system comprising:
a photonic integrated circuit including:
(i) an optical ring resonator having a closed loop waveguide of nonlinear optical media situated between a first waveguide and a second waveguide, wherein the first and second waveguides are parallel to one another, the resonator characterized at a low optical power state by a resonant wavelength;
(ii) a transmitter input port for directing light into the first waveguide; and
(iii) a light transceiver port at an end of the first waveguide opposite from the transmitter input port; and
a first light detector situated to receive light that exits from an end of the second waveguide, such that light at the resonant wavelength of insufficient power to shift the resonance of the resonator entering the first waveguide through the light transceiver port will be redirected by the resonator into the second waveguide, which directs the light to the first light detector.

16. The monostatic optical system of claim 15, further comprising:
a second light detector situated to receive light that exits from an end of the second waveguide remote from the light transceiver port; and
a tuner operatively coupled to the second light detector and the optical ring resonator so as to tune the resonant ring wavelength of the optical ring resonator responsive to signals from the second light detector.

17. A method of light detection and range finding comprising:
providing a photonic integrated circuit having an optical ring resonator having a closed loop waveguide of nonlinear optical media situated between a first waveguide and a second waveguide, the resonator characterized by a resonant wavelength at a low optical power state;
transmitting a series of light pulses of the resonant wavelength through an input port of the first waveguide, wherein the light pulses have sufficient power to shift the resonant wavelength of the resonator so that the light pulses continue through the first waveguide and out through a transceiver end of the first waveguide with no more than 3 dB of light power loss;
receiving externally reflected light into the transceiver end of the first waveguide at intervals between the transmission of the light pulses, wherein the reflected light has insufficient power to shift the resonant wavelength of the resonator;
directing the reflected light out of the resonator into the second waveguide; and
detecting the reflected light at a first light detector situated at an end of the second waveguide.

18. The method of light detection and range finding of claim 17, further comprising detecting light fed back from the ring resonator and tuning the optical characteristics of the ring resonator in response to the detection of fed back light.

19. A photonic integrated circuit for transmitting and receiving light along a same optical path comprising:
a transmitter input port into which light gets directed
a light transceiver port out from which light exits;

a Mach-Zehnder interferometer of nonlinear optical media situated along a first optical path between the transmitter input port and the light transceiver port, wherein the light transceiver port transmits light passed through from the transmitter input port and receives externally reflected light; and a second optical path into which the externally reflected light is guided by the interferometer.

20. The photonic integrated circuit of claim 19, further comprising a light detector situated on the photonic integrated circuit to receive light that exits through the second optical path.

\* \* \* \* \*